Patented June 15, 1948

2,443,173

UNITED STATES PATENT OFFICE 2,443,173

PAINT REMOVER

Nathaniel L. Baum and Jean Wynkoop, Los Angeles, Calif., assignors to Turco Products, Inc., Los Angeles, Calif., a corporation of California No Drawing. Application April 20, 1945, Serial No. 589,456

7 Claims. (Cl. 252—127)

This invention relates to a paint, varnish, lacquer, and enamel remover.

Protective coatings, e. g., paints, varnishes, and lacquers, are composed of a pigment dispersed in a vehicle which has the property of forming a tough film on the surface coated thereby. Such protective coatings may be of the drying-oil type, employing tung oil, linseed oil, oiticica oil, or fish oils. They may be formed of rosin, polymerized rosin, or synthetic ester gums, for example, glycerol triabietate or pentaerythritol tetraabietate, maleic-modified ester gum, phenolic-modified ester gum, phenolic resins, urea resins, melamine resins, alkyd resins, etc.

The necessity for removing such, and other commonly employed, protective coatings has resulted in the development of what is generally referred to as "paint removers." Prior art paint removers include the alkali type, which includes aqueous mixtures containing alkali or ammonia dissolved therein. They may be classed as aqueous in the sense that water forms the major proportion of the constituents employed and water or water solution forms the external or continuous phase. Such materials act primarily by chemical attack on the protective coating film.

We have developed a paint remover of the non-aqueous type, employing this term in the sense that the continuous or external phase is an organic solvent for the paint, varnish, lacquer, or enamel film. This organic solvent may contain some water in solution or emulsion. Water, if present, forms but a relatively minor proportion of the constituents of the formulation, ranging from less than 1% to about 20% by weight. The composition has dispersed therein a colloid which imparts thixotropic properties to the organic liquid. The dispersion also has a high adhesive tension against the protective coating.

Because of these properties the paint remover of our invention can be sprayed, brushed, or run into a surface coated by the protective coating to be removed. The thixotropic gel characteristics of the composition forming the paint remover of our invention are such that the mechanical motion inherent in the application of the paint remover to the coated surface gives a liquid of such low viscosity as to permit ready application. When applied to the surface to be treated, the gel is re-established and a relatively thick coat of the composition adheres to the protective coating. This is equally so both for horizontal and vertical surfaces. The coating of the thixotropic composition will not run appreciably on the vertical or horizontal surface but will remain in place where applied after the mechanical agitation incidental to its application is discontinued.

We may therefore place a thick coat of paint remover on the surface to be treated with minimum run-off and even with no run-off, if care is taken in its application. The coating of the remover may be readily removed by wiping, its gel properties being destroyed by the mechanical agitation due to wiping. It may also be removed by washing with water, the mechanical agitation in this case also being assisted by the emulsification or dispersion of the paint remover in the water due to the presence of emulsifying or dispersing agents in our paint remover.

We employ as our active paint remover solvent a chlorinated organic solvent. Such materials include, for example, methylene chloride, ethylene chloride, trichloroethylene, perchlorethylene, dichloroethylene ether, dichlorisopropyl ether, monochlor benzene, and dichlorobenzene. These are listed to illustrate the nature of the solvents employed and are not intended to limit the scope of the disclosed invention to such listed compounds. All of these compounds are solvents for protective films such as described above. We may employ other organic paint film solvents which have the properties specified above. We prefer to use the chlorinated organic solvents, since they have particularly good paint-removing action and form the thixotropic material of our invention readily and act in such mixture, in combination with the other ingredients thereof, in a highly efficacious manner.

In order to impart thixotropic properties to such chlorinated solvents, we disperse therein a protein colloid such as casein, zein, protein material derived from soya bean meal or cottonseed meal or mixtures thereof.

In order to assist in the dispersion of said colloid and impart emulsifying characteristics to our paint remover, we may employ a soap, such as the alkali metal or ammonia soaps of the fatty or unsaturated fatty acids, for example, the soaps of palmitic, stearic, oleic, ricinoleic, linoleic acid, the corresponding soaps of the resin acids, such as the abietates or the impure abietates known as "tall" oil.

We also employ as supplementary dispersing agents in addition to the above soaps, the salts of the phenols, including in the term "phenol" $C_6H_5OH$, as well as the substituted phenols such as the cresols or cresylic acids, for example, the petroleum cresylic acids.

The soap and phenolic salts are preferably formed by reacting the carboxylic acid and the phenol with NaOH, KOH, or NH₄OH. We may employ the base in amount equivalent to a portion or all of the carboxylic acid, and may also, if desired, employ the base in amount equivalent to a portion of the phenol but insufficient to neutralize both the acid and the phenol.

While we do not desire to be bound by any theory of the reactions which occur, we believe that the active dispersing ingredient includes the soap of the acid and some phenolate or cresylate, but that a portion of the phenol, for example, cresol, is in its acid form; in other words, we have an excess of phenol, for example, cresol, in our composition.

We form the thixotropic dispersion of the protein in the chlorinated solvent with the aid of such dispersing agents. The dispersion may be assisted by the use of mutual solvents. These mutual solvents may also act to reinforce the solvent action of the chlorinated solvent to improve the paint-removing properties of the resultant formulation. Such modifying solvent is preferably an alcohol and includes the monohydric and polyhydric alcohols. We find the lower aliphatic alcohols, such as methyl, ethyl, or propyl alcohol, or isopropyl alcohol, particularly useful for such purpose.

We may employ such mutual solvents as the monohydric alcohols, such as methyl alcohol, ethyl alcohol, propyl alcohol, or isopropyl alcohol, or the polyhydric alcohols, such as glycol or glycerine or their monoalkyl ethers, for example, ethylene glycol, propylene glycol, diethylene glycol, hexane-1-2 diol, the glycol ethers, such as ethyleneglycolmonoethylether, ethyleneglycol-monomethylether, ethyleneglycolmonopropyl ether, diethyleneglycol, polyethyleneglycol, or glycerine.

These solvents not only act as solvent modifiers to develop the thixotropic properties of the protein dispersion but also have the property of adding to or reinforcing the paint-removing solvent properties of the chlorinated solvent. This is particularly true of the monohydric alcohols or the lower aliphatic alcohols such as the methyl, ethyl or propyl or isopropyl alcohol. We may therefore employ such lower aliphatic alcohols as additives to the polyhydric alcohols or their ethers to supply not only the desired mutual solvency action but the desirable reinforcement of the paint-removing solvent action of the chlorinated solvent.

The free cresol or phenol also has a solvency action, both as a mutual solvent and as an agent to reinforce the action of the paint-removing solvent upon the protective coating.

We have found that, although not essential to the utility of our paint remover, a small amount of wax, such as a petroleum wax, for example, one having a melting point of about 125° F. to 135° F., improves the efficiency of the paint remover by retarding the evaporation of the solvent while in contact with the coated surface.

The compositions thus formed contain the chlorinated solvent in preponderate amount, being one of the components of the mixture present in greatest quantity. The organic liquid component, i. e., chlorinated solvent, other mutual solvent, and amines when employed forms the major component of the composition, the casein, soap, and phenol, when employed, forming the components used in minor amounts. The casein and the soap, phenol, mutual solvent or amine are added in amounts to establish the desired thixotropic dispersion of the casein in the chlorinated solvent to form a uniform dispersion of the ingredients in the organic liquids of the composition.

The following examples illustrate the formulations embodying the principles of our invention:

*Example 1*

We intimately mix 25 grams of casein with 25 grams of diethyleneglycol and 50 grams of NH₄OH (26° Bé.), 10 grams of oleic acid. The mixture is allowed to remain at room temperature for several days. We then add 30 cc. of ethanol, adding slowly to avoid curdling, and 120 cc. of ethylenedichloride in which we have dissolved 3 grams of paraffin wax, and 35 cc. of methylcellosolve (ethyleneglycolmonomethylether).

We may improve the dispersion of the protein by employing as a dispersing agent in place of or in addition to the soap a salt of phenolic compound, such as the sodium or potassium or ammonium phenolates or cresylates previously referred to. This is illustrated by Example 2. In that example we employ tall oil in place of the oleic acid and supplement the dispersing action by employing the cresylates. This example illustrates the formulation in which we do not employ the polyhydric alcohols or their ethers but do employ the monohydric alcohols.

*Example 2*

We mix 7 grams of casein and 4 grams of 26° Bé. NH₄OH, 7 grams of petroleum cresylic acid, 5 grams of tall oil, 0.6 gram of caustic potash, and .4 gram of caustic soda, and 12 grams of water until a smooth dispersion has been formed, employing moderately elevated temperatures in the dispersion. To this mixture we add 7 grams of 95% ethanol, and then add 53 grams of ethylenedichloride in which we have dissolved 2 grams of paraffin.

The paint remover thus formed has the thixotropic properties previously referred to. Additionally, it is quite readily emulsified or dispersed in water so that it can be readily washed off from the painted surface to leave a clean surface free of the protective film and free of the paint remover.

We have found that the formulation of the paint remover according to our invention is improved by the use of an amine. We have found that the protein is effectively dispersed in the organic paint-removing solvent by the use of such amine. The resultant paint remover has the thixotropic properties previously referred to.

The amines which may be employed in making our thixotropic paint remover include the aliphatic amines, cyclo aliphatic amines, aryl aliphatic amines, aromatic amines, hydroxy aliphatic amines, or commercially available mixtures of such amines. Among such compounds may be mentioned, for example, monoethanolamine, diethanolamine, triethanolamine, and mixtures thereof, including such as occur in commercial triethanolamine, morpholine, propanolamines, including normal propanolamine and triisopropanolamine, butanolamines, pentanolamines, hexanolamines, glycerolamines; alkylolpolyamines, such as alkylol derivatives of ethylenediamine and diethylenetetramine; alkylated and other derivatives of alkylolamines, including, for example, diethylaminoethanol, phenylethanolamine, phenyl diethanolamine, cyclohexylethanolamine, phenylmorpholine, monomethylethanolamine, dimethylethanolamine, monoethyltriethanolamine, diethyltriethanolamine, ethylphenylethanolamine, and the like; alkylamines, such as ethylenediamine, diethylenetriamine, triethylenetetramine, butylamine, hexylamine, octylamine, laurylamine, monomethylethylenediamine, monoethyldiethylenetriamine, 1, 1-dimethylethylenediamine, and the like; and aromatic and heterocyclic bases, such as pyridine, benzylamine and homologues thereof, and derivatives or substitution products thereof.

The formulation given in Example 3 illustrates one formulation employing the amine as the agent for forming the thixotropic dispersion of the protein in the organic solvents.

Example 3

We heat 100 grams of triethanolamine and 25 grams of casein at an elevated temperature for several hours until a smooth dispersion has been formed. After cooling, we then add 30 cc. of ethanol (95%) and finally add 120 cc. of ethylenedichloride in which 2 grams of paraffin have been dissolved. In this case we omit the soap and cresylic acid and prolong the heating for a sufficient period to obtain the necessary dispersion of the casein.

We have found, however, that the dispersion of the casein on the organic solvent is assisted by the use of a mutual solvent such as those listed above. Such formulations are exemplified below.

Example 4

We mix 60 grams of diethyleneglycol, 20 grams of cyclohexylamine, and 35 grams of casein, and heat the mixture until a smooth dispersion is formed. We then add 30 grams of ethanol (95%), adding the ethanol slowly to avoid curdling and add 120 grams of ethylenedichloride in which we have dissolved 3 grams of paraffin wax.

The formulations employing amines as dispersing agents are further improved by adding soaps such as previously described or the salts of the phenols or cresols described above. These dispersing agents also improve the dispersibility of the formulated paint remover in water. The formulations thus produced have excellent thixotropic properties and will form thick coatings which adhere to surfaces and may be readily removed by wiping or washing with water.

The following examples are given as illustrative but not as a limitation of our invention:

Example 5

We disperse 35 grams of casein in 20 grams of cyclohexylamine and 50 grams of diethyleneglycol. To this mixture we add a second mixture formed by reacting 2.7 grams of 50% KOH with 7.6 grams of oleic acid, 23.45 grams of cresol, and 2.5 grams of water. We then add 35 ml. of 95% ethanol, and finally add 120 grams of ethylene dichloride in which we have dissolved 3 grams of paraffin.

Example 6

We disperse 40 grams of casein in 25 grams of diethyleneglycol and 30 grams of triethanolamine. To this mixture we add a mixture formed by reacting 3.8 grams of 50% KOH and 10.8 grams oleic acid and 33.5 grams of cresol and 4 grams of water. The reaction mix has a pH of about 5 to 6. Then we add 30 ml. of 95% ethanol and finally 120 cc. of ethylenedichloride in which we have dissolved 2 grams of paraffin wax.

Example 7

We disperse 40 grams of casein in 25 grams of diethylene glycol and 20 grams of triethanolamine. We then add a mixture formed by reacting 33.5 grams of cresol, 4 grams of water and 3.8 grams of 50% KOH and 10.8 grams of oleic acid. We then add 40 ml. of 95% ethanol and then add a solution of 80 ml. ethylenedichloride and 40 ml. of dichloroisopropylether in which we have dissolved 2 grams of paraffin.

Example 8

We disperse 40 grams of casein in 25 grams of diethyleneglycol and 20 grams of pyridine. To this dispersion we add a mixture formed by reacting 21.6 grams of oleic acid, 67 grams of cresol and 7.6 grams of 50% KOH and 8 grams of water. We then add 30 cc. of 95% ethanol. We then add 120 cc. of ethylenedichloride in which we have dispersed 2 grams of paraffin wax.

Example 9

We disperse 30 grams of casein in 25 grams of diethyleneglycol and 15 grams of aniline. To this dispersion we add a mixture formed by reacting 10.8 grams of oleic acid, 33.5 grams of cresol and 3.8 grams of 50% KOH and 4 grams of water. We then add 30 ml. of ethanol and a mixture of 50 cc. ethylenedichloride and 75 cc. of monochlorobenzene in which we have dissolved 3 grams of paraffin.

In forming our paint remover in accordance with these formulations, we heat the protein, amine, and the polyhydric compound to a temperature of about 180° F. to 200° F. until a smooth dispersion of the protein in the amine and polyhydroxy compound is formed. A solution of alkali, oleic acid, cresol, or phenol, containing some water, is formed. This solution is acidic, being of a pH in the neighborhood of 5 to 6. It is added to the hot dispersion of the protein and the mixture is mixed at an elevated temperature to complete the dispersion. To this dispersion of the protein we may then add the alcohol, stirring during addition to avoid curdling. We then add the chlorinated solvent.

In all of the above examples where we have employed the bases with the oleic acid, the reaction between the two products formed a soap of the oleic acid. However, the acidic phenol may react with the soap or compete with the oleic acid for the base so that a distribution of the base between the phenol or cresol and the carboxylic acid may occur. When we refer to a paint remover comprising a soap and a phenol, for example cresol, we mean to include also such composition containing the carboxylic acid of said soap and the salts of said phenol.

While we have employed in all of the above examples insufficient alkali to convert the cresols into the salt, and thus the cresol is probably added as free cresol, we do not exclude the possibility of some interaction between the amine and the cresol when they are compounded. Therefore, wherein we refer to a paint remover containing a phenol or cresol and an amine, we mean to include the products of interaction between the cresol and the amine.

In formulating our paint remover we employ sufficient protein colloid and dispersing agent to form a thixotropic dispersion of the protein colloid in said solvent. The proportions of protein colloid, dispersing agent, amine, when employed, mutual solvent, and alcohol are adjusted to give such thixotropic dispersion. The exact proportions may be adjusted over a wide range, depending on the materials employed as protein colloid, paint removing solvent, and mutual solvent and dispersing agent. However, for any particular formulation, the relative proportions of the protein colloid, dispersing agent, and mutual solvent which will yield a thixotropic dispersion in accordance with our invention are adjustable over relatively narrow limits. These limits, however, will vary somewhat with the character of these materials employed and the relative proportions of the components of the particular formulation.

While we have described a particular embodiment of our invention, it should be understood that various modifications and adaptations thereof may be made within the spirit of the invention as set forth in the appended claims.

We claim:

1. A thixotropic water dispersible paint remover comprising a thixotropic dispersion of a protein colloid in a paint remover solvent, a stabilizer for said dispersion comprising a reaction product of a base chosen from the group composed of the alkali metal hydroxides, ammonium hydroxide with an organic acid taken from the group of the soap forming saturated fatty acids, soap forming unsaturated fatty acids, resin acids, said dispersion of the protein being in a mixture of a liquid chlorinated hydrocarbon solvent and mutual solvent modifier taken from the group of the aliphatic alcohols and aliphatic ether alcohols and water dispersed in said solvent, said liquid chlorinated hydrocarbon solvent being in preponderate proportion, and said water being in the range of about 1% to about 20% by weight of said thixotropic paint remover, and said dispersion being thixotropic so that on agitation said mixture is a fluid and when at rest is a gel having the property of adhering to painted surfaces without substantial running and dispersible in water so that it may be washed from a surface to which it is applied.

2. A thixotropic water dispersible paint remover comprising a thixotropic dispersion of a protein colloid in a paint remover solvent, a stabilizer for said dispersion comprising the reaction product of an inorganic base taken from the group composed of the alkali metal bases and ammonia with a phenol and also with a soap forming organic acid taken from the group of the soap forming saturated fatty soap forming acids, unsaturated fatty acids and resin acids, the ratio of said inorganic base to said organic acid and said phenol being insufficient to completely neutralize both said organic soap forming acid and said phenol, said paint remover solvent being composed of a liquid chlorinated hydrocarbon solvent and a mutual solvent modifier taken from the group of the aliphatic alcohols and aliphatic ether alcohols and water dispersed in said solvent, said water being within the range of about 1% to about 20% by weight of said thixotropic paint remover, said liquid chlorinated hydrocarbon solvent being the predominating ingredient, and said paint remover being thixotropic so that on agitation said mixture is a fluid and when at rest is a gel having the property of adhering to painted surfaces without substantial running and dispersible in water so that it may be washed from a surface to which it is applied.

3. A thixotropic water dispersible paint remover comprising a thixotropic dispersion of a protein colloid in a paint remover solvent, a stabilizer for said dispersion comprising the reaction product of an inorganic base taken from the group composed of the alkali metal bases and ammonia with a phenol and also with a soap forming organic acid taken from the group of the soap forming saturated fatty acids, soap forming unsaturated fatty acids and resin acids, the ratio of said inorganic base to said soap forming organic acid and said phenol being insufficient to completely neutralize both said organic soap forming acid and said phenol, and said paint remover including also an organic amine, said paint remover solvent being composed of a liquid chlorinated hydrocarbon solvent in preponderant proportion and a mutual solvent modifier taken from the group of the aliphatic alcohols and aliphatic ether alcohols and water dispersed in said solvent, said water being within the range of about 1% to about 20% by weight of said thixotropic paint remover, said organic amine being in the range of from 4% to 10% by weight of said thixotropic paint remover, and said paint remover being thixotropic so that on agitation said mixture is a fluid and when at rest is a gel having the property of adhering to painted surfaces without substantial running and dispersible in water so that it may be washed from a surface to which it is applied.

4. A thixotropic water dispersible paint remover comprising a thixotropic dispersion of a casein colloid in a paint remover solvent, a stabilizer for said dispersion comprising a reaction product of a base chosen from the group composed of the alkali metal hydroxides, ammonium hydroxide, with an organic acid taken from the group of the soap forming saturated fatty acids, soap forming unsaturated fatty acids, resin acids, said dispersion of the casein being in a mixture of a liquid chlorinated hydrocarbon solvent and mutual solvent modifier taken from the group of the aliphatic alcohols and aliphatic ether alcohols and water dispersed in said solvent, said chlorinated hydrocarbon solvent being in preponderate proportion, and said water being in the range of about 1% to about 20% by weight of said thixotropic paint remover, and said liquid chlorinated hydrocarbon solvent being in preponderant proportion and said dispersion being thixotropic so that on agitation said mixture is a fluid of low viscosity and when at rest is a gel having the property of adhering to painted surfaces without substantial running and dispersible in water so that it may be washed from a surface to which it is applied.

5. A thixotropic water dispersible paint remover comprising a thixotropic dispersion of a casein colloid in a paint remover solvent, a stabilizer for said dispersion comprising the reaction product of an inorganic base taken from the group composed of the alkali metal bases and ammonia with a phenol and also with a soap forming organic acid taken from the group of the saturated fatty acids, unsaturated fatty acids and resin acids, the ratio of said inorganic base to said soap forming organic acid and said phenol being insufficient to completely neutralize both said organic soap forming acid and said phenol, said paint remover solvent being composed of a liquid chlorinated hydrocarbon and a mutual solvent modifier taken from the group of the aliphatic alcohols and aliphatic ether alcohols and water dispersed in said solvent, said water being within the range of about 1% to about 20% by weight of said thixotropic paint remover, and said liquid chlorinated hydrocarbon solvent being in preponderant proportion and said paint remover being thixotrope so that on agitation said mixture is a fluid and when at rest is a gel having the property of adhering to painted surfaces without substantial running and dispersible in water so that it may be washed from a surface to which it is applied.

6. A thixotropic water dispersible paint remover comprising a thixotropic dispersion of a casein colloid in a paint remover solvent, a stabilizer for said dispersion comprising the reaction product of an inorganic base taken from the group composed of the alkali metal bases and ammonia with a phenol and also with a soap forming organic acid taken from the group of the saturated fatty acids, unsaturated fatty acids and resin acids, the ratio of said inorganic base to said organic acid and said base being insufficient to completely neutralize both said organic soap forming acid and said phenol and said paint remover including an organic amine, said paint remover solvent being composed of a liquid chlorinated hydrocarbon and a mutual solvent modifier taken from the group of the aliphatic alcohols and aliphatic ether alcohols and water dispersed in said solvent, said water being within the range of about 1% to about 20% by weight, said organic amine being in the range of from 4% to 10% by weight of said thixotropic paint remover, and said liquid chlorinated hydrocarbon solvent being in preponderant proportion and said paint remover being thixotropic so that on agitation said mixture is a fluid and when at rest is a gel having the property of adhering to painted surfaces without substantial running and dispersible in water so that it may be washed from a surface to which it is applied.

7. A thixotropic water dispersible paint remover comprising a thixotropic dispersion of casein in a reaction product of ammonia, caustic soda, caustic potash, tall oil, cresylic acid and water in a solvent composed of 95% ethanol, ethylene dichloride, said ingredients being employed substantially in the ratio of 7 grams of casein to 4 grams of 26° Bé. NH₄OH, 7 grams of cresylic acid, 5 grams tall oil, 0.6 gram caustic potash, 0.4 gram caustic soda, 12 grams of water, 7 grams of 95% ethanol, and 53 grams of ethylene dichloride.

NATHANIEL L. BAUM.
JEAN WYNKOOP.

REFERENCES CITED

The following references are of record in the file of this patent:

UNITED STATES PATENTS

| Number | Name | Date |
| --- | --- | --- |
| 919,143 | Ellis | Apr. 20, 1909 |
| 956,320 | Ellis | Apr. 26, 1910 |
| 1,102,330 | Ellis | July 7, 1914 |
| 1,113,971 | Ellis | Oct. 20, 1914 |
| 1,172,772 | Ellis | Feb. 22, 1916 |
| 1,189,803 | Ellis | July 4, 1916 |
| 1,829,583 | Davidson | Oct. 27, 1931 |
| 2,032,174 | Johnson | Feb. 25, 1936 |

---

Certificate of Correction

Patent No. 2,443,173.                                    June 15, 1948.

NATHANIEL L. BAUM ET AL.

It is hereby certified that error appears in the printed specification of the above numbered patent requiring correction as follows: Column 8, lines 51 and 52, claim 4, strike out the words "of low viscosity"; and that the said Letters Patent should be read with this correction therein that the same may conform to the record of the case in the Patent Office.

Signed and sealed this 7th day of September, A. D. 1948.

[SEAL]

THOMAS F. MURPHY,
*Assistant Commissioner of Patents.* of said thixotropic paint remover, and said liquid chlorinated hydrocarbon solvent being in preponderant proportion and said paint remover being thixotrope so that on agitation said mixture is a fluid and when at rest is a gel having the property of adhering to painted surfaces without substantial running and dispersible in water so that it may be washed from a surface to which it is applied.

6. A thixotropic water dispersible paint remover comprising a thixotropic dispersion of a casein colloid in a paint remover solvent, a stabilizer for said dispersion comprising the reaction product of an inorganic base taken from the group composed of the alkali metal bases and ammonia with a phenol and also with a soap forming organic acid taken from the group of the saturated fatty acids, unsaturated fatty acids and resin acids, the ratio of said inorganic base to said organic acid and said base being insufficient to completely neutralize both said organic soap forming acid and said phenol and said paint remover including an organic amine, said paint remover solvent being composed of a liquid chlorinated hydrocarbon and a mutual solvent modifier taken from the group of the aliphatic alcohols and aliphatic ether alcohols and water dispersed in said solvent, said water being within the range of about 1% to about 20% by weight, said organic amine being in the range of from 4% to 10% by weight of said thixotropic paint remover, and said liquid chlorinated hydrocarbon solvent being in preponderant proportion and said paint remover being thixotropic so that on agitation said mixture is a fluid and when at rest is a gel having the property of adhering to painted surfaces without substantial running and dispersible in water so that it may be washed from a surface to which it is applied.

7. A thixotropic water dispersible paint remover comprising a thixotropic dispersion of casein in a reaction product of ammonia, caustic soda, caustic potash, tall oil, cresylic acid and water in a solvent composed of 95% ethanol, ethylene dichloride, said ingredients being employed substantially in the ratio of 7 grams of casein to 4 grams of 26° Bé. $NH_4OH$, 7 grams of cresylic acid, 5 grams tall oil, 0.6 gram caustic potash, 0.4 gram caustic soda, 12 grams of water, 7 grams of 95% ethanol, and 53 grams of ethylene dichloride.

NATHANIEL L. BAUM.
JEAN WYNKOOP.

REFERENCES CITED

The following references are of record in the file of this patent:

UNITED STATES PATENTS

| Number | Name | Date |
| --- | --- | --- |
| 919,143 | Ellis | Apr. 20, 1909 |
| 956,320 | Ellis | Apr. 26, 1910 |
| 1,102,330 | Ellis | July 7, 1914 |
| 1,113,971 | Ellis | Oct. 20, 1914 |
| 1,172,772 | Ellis | Feb. 22, 1916 |
| 1,189,803 | Ellis | July 4, 1916 |
| 1,829,583 | Davidson | Oct. 27, 1931 |
| 2,032,174 | Johnson | Feb. 25, 1936 |

---

Certificate of Correction

Patent No. 2,443,173.   June 15, 1948.

NATHANIEL L. BAUM ET AL.

It is hereby certified that error appears in the printed specification of the above numbered patent requiring correction as follows: Column 8, lines 51 and 52, claim 4, strike out the words "of low viscosity"; and that the said Letters Patent should be read with this correction therein that the same may conform to the record of the case in the Patent Office.

Signed and sealed this 7th day of September, A. D. 1948.

[SEAL]

THOMAS F. MURPHY,
*Assistant Commissioner of Patents.*